Jan. 6, 1925.

P. HAAS 1,521,619

CONNECTER

Filed Feb. 26, 1924

Inventor
Philip Haas
By his Attorney
Louis Prevost Whitaker

Patented Jan. 6, 1925.

1,521,619

UNITED STATES PATENT OFFICE.

PHILIP HAAS, OF DAYTON, OHIO.

CONNECTER.

Application filed February 26, 1924. Serial No. 695,143.

*To all whom it may concern:*

Be it known that I, PHILIP HAAS, a citizen of the United States, residing at Dayton, in the county of Montgomery and State of Ohio, have invented certain new and useful Improvements in Connecters; and I do hereby declare the following to be a full, clear, and exact description of the invention, such as will enable others skilled in the art to which it appertains to make and use the same.

My invention consists in the novel features hereinafter described, reference being had to the accompanying drawing which shows several forms in which I have contemplated embodying the invention, selected by me for purposes of illustration and the said invention is fully disclosed in the following description and claim.

The object of my invention is to provide a satisfactory connection or coupling for devices provided with knob-like terminal portions, and which is particularly useful for connecting sections of ball chain to each other or to another device.

Referring to the drawings.

Figure 1:
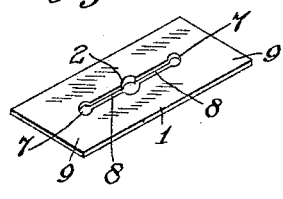
Fig. 1 represents a perspective view of a simple form of my connecter.
Figure 2:
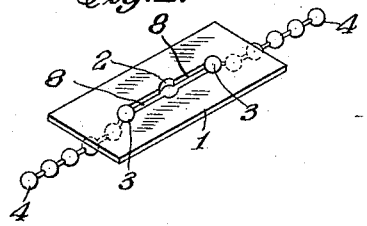
Fig. 2 is a similar view of the same form of connecter showing it employed or connecting the terminal ball members of two sections of ball chain.
Figure 3:
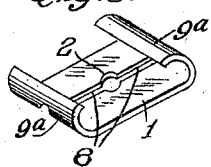
Fig. 3 is a perspective view of the same connecter illustrated in Fig. 1, showing the end portions bent over on the same side of the connecter, for the purpose of retaining the engaged ball or knob members in engagement therewith.
Figure 4:
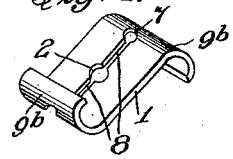
Fig. 4 is a perspective view of the same connecter illustrated in Fig. 1, showing the end portions bent in opposite directions for the same purpose.
Figure 5:
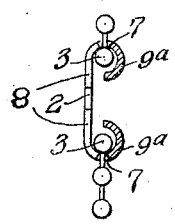
Fig. 5 is a sectional view of the form of connecter shown in Fig. 3, showing the ball or knob member connected thereby, enclosed within the end portions of the device.
Figure 6:
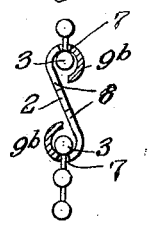
Fig. 6 is a similar sectional view of the form of connecter shown in Fig. 4.
Figure 7:
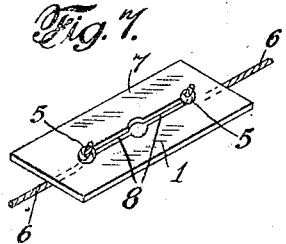
Fig. 7 is a detail view similar to Fig. 1, showing the manner in which two cords provided with knob like terminal knots or enlargements can be connected by the use of this device.
Figure 8:
Fig. 8 illustrates a form of terminal portion which may be provided in connection with any device to which it may be desired to connect a ball chain or other flexible connection, by means of the connecter shown herein.

Referring to the drawings, Figs. 1, 2 and 7, represent a simple form of my improved connecter which comprises a plate, 1, preferably of greater length than width and preferably formed of metal, although it might be made of celluloid, indurated fibre, bakelite, or other suitable sheet material. I prefer, however, to form it of comparatively thin ductile material, as sheet brass or copper, of a gauge sufficiently thin so that the end portions of the plate may be readily bent into substantially cylindrical form to enclose the members to be connected and prevent their accidental disengagement by the use of the fingers alone, or with a pair of light pliers. Under ordinary circumstances, it will be most satisfactory to form the device of sheet metal sufficiently thin to be bent in the manner hereinafter described by the fingers without the use of any tools whatever, although it may be made of heavier material, if desired, and as hereinafter stated, it may be used without bending at all. The plate, 1, is provided centrally with an aperture, 2, which is of sufficient size to permit the passage therethrough of the knob-like terminal portions of the parts to be connected. These may be the terminal ball, 3, of a section of the well known ball chain, 4, as indicated in Fig. 2, said chain comprising a plurality of hollow balls, flexibly united by bar links having enlarged head portions within the balls and in common use at the present time for various purposes, or they might be terminal knots or other enlargements, 5, of cord sections, 6, as indicated in Fig. 7, or any other terminal enlargement which it may be desirable to connect with a cord chain or other flexible connection. The plate, 1, is also provided on opposite sides of the central aperture, 2, with a smaller aperture, 7, the apertures 7, being each connected with the central aperture by a longitudinal slot, 8, as clearly shown in Fig. 1. The slots, 8, will be of such width as to accommodate the narrow portion of the cord or other chain (in the case of ball chain the bar link connecting two balls thereof), and the apertures, 7, are of slightly greater diameter than the slots, 8, in order to allow for a certain freedom of movement laterally of the part which passes therethrough, but are not large enough to permit the knob-like terminal to pass therethrough. It follows from this construction that when the device is in use the terminal enlargements tend to center themselves with respect to the apertures, 7, and thereby hold the adjacent narrow portions of the flexible connections (as the cord in the case of a cord with terminal knit is employed, or the connecting bars between balls in the case of a ball chain) out of frictional contact with the edges of the apertures, 7, thus preventing the chafing and wear of the flexible connections at their narrowest portions, which would take place if the plate were not provided with the end apertures, 7, of greater diameter than the slot, as shown. If the connecter is to be used in a perfectly flat condition, as indicated in Figs. 1, 2 and 7, for example, in connecting the terminal balls of two sections of ball chain, the terminal balls, 3, are each passed through the central operture, 2, one being moved along one of the slots, 8, until the connecting bar link which unites it to the adjacent ball occupies one of the apertures, 7, in which it centers itself, the other terminal ball, 3, being moved along the opposite slot, 8, until its connecting bar link engages the other aperture, 7, and centers itself with respect thereto, when the parts will be firmly connected (while the adjacent connecting links are held out of contact with the plate.) Fig. 7 illustrates the manner in which the connecter may be used to connect two sections of cord, 6, the ends of which have been provided with knob-like terminals, as by forming enlarged knots, 5, therein.

Where the plate, 1, is formed of ductile metal, I prefer to bend each of the end portions, 9, into substantially cylindrical form, as indicated at 9ª, in Figs. 3 and 4, so as to enclose the terminal balls or enlargements, 3—3, and prevent their accidental displacement. In Figs. 3 and 5 I have shown end portions, 9ª, bent over around the knob-like devices to be connected on the same side of the plate. In Figs. 4 and 6 I have shown the end portions, here indicated at 9ᵇ, bent in opposite directions so that the device forms a letter S in cross section, as shown in Fig. 6. In either case it will be noted that the two chain sections or other devices to be connected will be maintained in axial alignment which may be desirable in many instances where such connecter is employed. In case it is desired to connect a flexible ball chain cord or other connection with some device, such as a valve, arm or lever, for example, or other part to be operated, this can be conveniently accomplished by providing such part with a terminal portion, indicated for example in Fig. 8, having a substantial knob-like or spherical end, indicated at 10, connected by a narrow neck or shank, 11, with the device, as for example, a valve stem, 12, here shown broken away. Obviously this terminal knob-like portion, 10, can be inserted through the aperture, 2, in the plate, so as to bring the neck, 11, into the slot, 8, and thence into one of the apertures, 7, and a chain section or cord section can be connected to the other end of the connecter as hereinbefore described.

Figure 9:
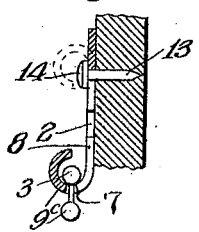
Fig. 9 shows my connecter employed for the purpose of suspending or attaching a flexible connection to a part by means of a nail or screw.

This connecter can also be used for suspending a section of ball chain or other article provided with a knob-like terminal portion, and in Fig. 9, for example, I have illustrated the manner in which the connecter can be used advantageously for this purpose. In this case the terminal ball, 3, or other knob-like terminal portion, is made to engage the aperture, 7, in one end of the plate, the adjacent end portion of the plate, here indicated at 9ᶜ, being bent over and around the terminal ball or projection, 3, and the plate itself being suspended from or connected to a stationary support, by means of a nail or screw, indicated at 13, having a head, 14, of a size that will pass through the central aperture, 2, permitting the shank of the screw or nail to pass through the slot, 8, at the opposite end of the connecter and rest in the aperture, 7. The upper end of the plate may or may not be bent over the head, 14, of the nail or screw, as may be preferred. It is shown in dotted lines in bent position, and in full lines in a straight position.

In the manufacture of these connecters, they may be made up in flat form, as indicated in Fig. 1, and will inevitably be so made if they are of a material not capable of being readily bent, and in this form may be used for many purposes. Where they are made of thin ductile metal they may be manufactured and sold in the flat form shown in Fig. 1, or they may be bent partially as indicated in Figs. 3 and 4, so that after the parts to be connected thereby are engaged with the connecter, the end portions may be finally bent down by the fingers or with a pair of pliers or other suitable tool if necessary to firmly engage the connected parts and hold them permanently against any possibility of accidental displacement.

What I claim and desire to secure by Letters Patent is:—

A connecter for parts having enlarged terminal portions, comprising a plate provided with a central aperture of a size sufficient to permit the passage therethrough of the terminal enlargements of the parts to be connected, and having adjacent to each end an aperture of less diameter than said terminal enlargements, said plate having slots of less diameter than said end apertures connecting each of them with said central aperture, whereby the said terminal enlargements of the parts to be connected may be brought into centering engagement with said end apertures of the plate and will hold the narrower portions of said parts to be connected out of engagement with the plate.

In testimony whereof I affix my signature.

PHILIP HAAS.